US010805199B1

(12) United States Patent
Ramabadran (10) Patent No.: US 10,805,199 B1
(45) Date of Patent: Oct. 13, 2020

(54) TESTING FORWARDING INFORMATION IN A NETWORK SWITCH

(71) Applicant: Amazon Technologies, Inc., Seattle, WA (US)

(72) Inventor: Srinivasan Ramabadran, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 16/020,837

(22) Filed: Jun. 27, 2018

(51) Int. Cl.
*H04L 12/26* (2006.01)
*H04L 12/947* (2013.01)
*H04L 29/06* (2006.01)
*H04L 12/24* (2006.01)

(52) U.S. Cl.
CPC ............ *H04L 43/12* (2013.01); *H04L 41/046* (2013.01); *H04L 43/50* (2013.01); *H04L 49/25* (2013.01); *H04L 69/16* (2013.01); *H04L 69/22* (2013.01)

(58) Field of Classification Search
CPC ..... H04W 12/06; H04W 40/24; H04W 24/00; H04L 45/22; H04L 45/28; H04L 45/02; H04L 41/12; H04L 45/38; H04L 45/50; H04L 45/00; H04L 49/15; H04L 12/4633; H04L 41/0668; H04L 45/507; H04L 45/04; H04L 45/42; H04L 45/64; H04L 45/74; H04L 47/10; H04L 47/11; H04L 47/125; H04L 63/02; H04L 63/0209
USPC ......................................................... 370/252
See application file for complete search history.

(56) References Cited

U.S. PATENT DOCUMENTS

| 7,457,277 | B1 | 11/2008 | Sharma et al. |
| 8,427,970 | B2 | 4/2013 | Benkis |
| 8,472,315 | B2 | 6/2013 | Sommerville et al. |
| 8,670,326 | B1 | 3/2014 | Balasubramanian et al. |
| 9,083,347 | B1 | 7/2015 | Remla et al. |
| 9,491,083 | B2 | 11/2016 | Brolin et al. |
| 9,547,570 | B2 | 1/2017 | Chu et al. |
| 9,577,911 | B1 | 2/2017 | Castleman |
| 9,596,164 | B1 | 3/2017 | Kumar et al. |
| 9,699,030 | B1 | 7/2017 | Kumar |
| 9,954,751 | B2 | 4/2018 | Zhang et al. |
| 10,038,597 | B2 | 7/2018 | Casado et al. |
| 10,044,646 | B1 | 8/2018 | Detwiler |
| 10,200,279 | B1 | 2/2019 | Aljaedi |
| 10,439,880 | B2 | 10/2019 | Bryant et al. |
| 10,462,037 | B1 | 10/2019 | Ramabadran |

(Continued)

OTHER PUBLICATIONS

U.S. Appl. No. 16/020,844, filed Jun. 27, 2018, Ramabadran et al.

(Continued)

*Primary Examiner* — Natasha W Cosme
(74) *Attorney, Agent, or Firm* — Klarquist Sparkman, LLP (57) ABSTRACT

A deterministic model is described that is used for testing networks by exercising forwarding rules (e.g., layer 2 and layer 3) on network devices. Within a single network hop, a light-weight agent can be used to control the testing. One or more probe packets can be injected into an ingress pipeline of a network device using the agent executing on a local processor. The probes are detected after performing at least layer 2 and layer 3 lookups. Hardware in switching logic redirects the probes to the local processor in order to verify the actual forwarding behavior applied on the probe packet.

21 Claims, 9 Drawing Sheets

(56) References Cited

U.S. PATENT DOCUMENTS

| | | |
|---|---|---|
| 2003/0185210 A1 | 10/2003 | McCormack |
| 2008/0117829 A1 | 5/2008 | Nakano et al. |
| 2009/0316588 A1 | 12/2009 | Nakamura |
| 2010/0014518 A1 | 1/2010 | Duncan et al. |
| 2014/0092751 A1 | 4/2014 | Meilik et al. |
| 2014/0119203 A1 | 5/2014 | Sundaram et al. |
| 2014/0119379 A1 | 5/2014 | Liang et al. |
| 2015/0188798 A1 | 7/2015 | Mizrahi et al. |
| 2015/0222533 A1 | 8/2015 | Birrittella et al. |
| 2016/0094439 A1 | 3/2016 | Ravindran et al. |
| 2016/0127192 A1 | 5/2016 | Bryant et al. |
| 2016/0254985 A1 | 9/2016 | Judge et al. |
| 2017/0222881 A1 | 8/2017 | Holbrook et al. |
| 2017/0346765 A1 | 11/2017 | Immidi |
| 2018/0091405 A1* | 3/2018 | Koktan ............... H04L 45/7457 |
| 2018/0167294 A1 | 6/2018 | Gupta et al. |
| 2018/0212876 A1 | 7/2018 | Bacthu et al. |
| 2019/0052552 A1 | 2/2019 | Holbrook et al. |
| 2019/0052556 A1 | 2/2019 | Duda et al. |
| 2019/0182166 A1 | 6/2019 | Ghazisaeedi et al. |
| 2019/0273681 A1 | 9/2019 | Williams et al. |

OTHER PUBLICATIONS

Zeng et al., "Automatic Test Packet Generation," Proceedings of the 8th International Conference on Emerging Networking Experiments and Technologies, Dec. 2012, 12 pages.

* cited by examiner

TESTING FORWARDING INFORMATION IN A NETWORK SWITCH

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. ECMP is per-hop decision limited to a single router, and can be inefficient if routers in the network are not functioning.

Testing of network switches can be problematic. Typically, test probes are sent from a source host device through a network of switches to a destination host device. The probes are effective at testing the paths and links in the network, but not effective at testing forwarding states of the network devices themselves.

DETAILED DESCRIPTION

A deterministic model is described that is used for testing networks by exercising forwarding rules (e.g., layer 2 and layer 3) on network devices. Within a single network hop, a light-weight agent can be used to control the testing. One or more probe packets can be injected into an ingress pipeline of a network device using the agent executing on a local processor. The probes are detected after performing at least layer 2 and layer 3 lookups. Hardware in switching logic redirects the probes to the local processor in order to verify the actual forwarding behavior applied to the probe packet.

Figure 1:
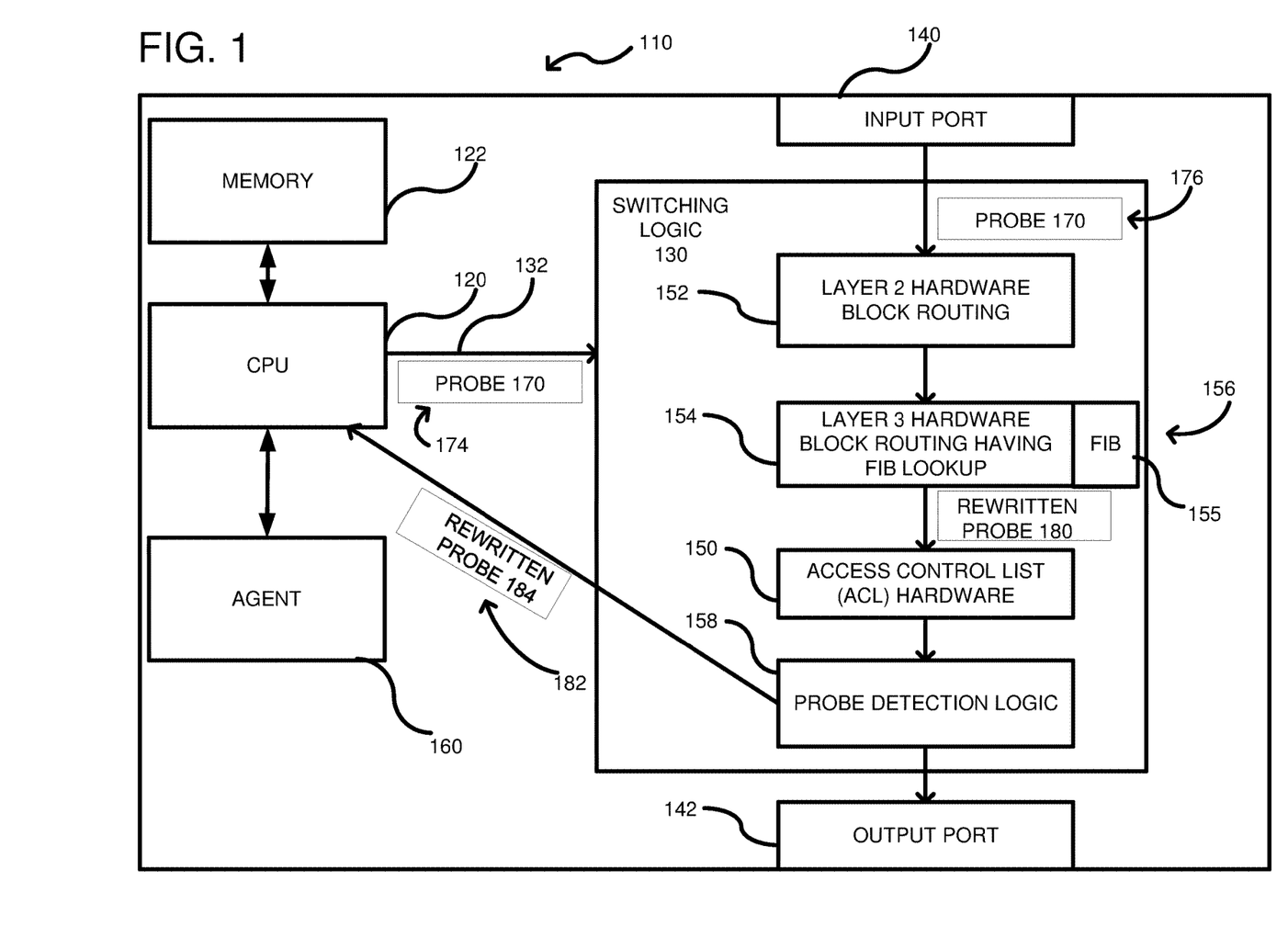
FIG. 1 is a diagram illustrating a network device including an ability to test its own forwarding tables.

FIG. 1 shows a detailed example of an embodiment of the network device 110. The network device 110 can be any switch for forwarding packet data including, but are not limited to, a router, a switch, a load balancer, a firewall, etc. Network device 110 is a switch that routes packets to a next hop in the network using a destination Internet Protocol (IP) address. A CPU 120 is coupled to a memory 122 and to switching logic 130 through a bus 132 (PCIe or other protocols and bus types can be used). Although a central processing unit (CPU) is shown, any desired controller can be used including a processor in an application-specific integrated circuit (ASIC) or any other type of processor. The switching logic 130 is positioned between an input port 140 and an output port 142, which are typically adapted to receive network cables, such as Ethernet cables. Although the input port 140 and output port 142 are shown as a single port, it should be understood that there are actually many ports that the network packets can be routed to. The switching logic 130 can be a single ASIC integrated circuit or divided into multiple integrated circuits. The switching logic 130 can include multiple different hardware logic blocks including a Layer 2 hardware block 152, a Layer 3 hardware block 154, and an Access Control List (ACL) hardware block 150. The layer 2 hardware block 152 relates to an Ethernet layer and can forward packets based on Media Access Control (MAC) tables (not shown). The layer 3 hardware block 154 relates to forwarding based on a longest prefix match of an IP address. Layer 3 typically involves a route lookup, decrementing a Time-To-Live (TTL) count, calculating a checksum, and forwarding the frame with the appropriate MAC header to the correct output port. The route lookup of the layer 3 hardware can include searching within a Forwarding Information Base (FIB) 155, which includes destination addresses for packets being transmitted through the switching logic 130 and rewriting the packets in accordance with the lookup. Rewriting can occur in a rewrite engine, which can be external to the layer 3 hardware or included internally therein. The network device 110 can run routing protocols, such as an Open Shortest Path First (OSPF) or a Routing Information Protocol (RIP), to communicate with other Layer 3 switches or routers. The routing tables are used to lookup the route for an incoming packet. The ACL block 150 relates to permissions and can include rules whether to drop packets. More specifically, the ACL block can provide rules that are applied to different ports. Additionally, the ACL block can have rules that are applied to designated IP addresses. The ACL block can control outbound packets and in this sense, it is similar to a firewall. The layer 2 hardware 152, the layer 3 hardware 154 and the ACL 150 together form an ingress pipeline 156. A probe detection logic 158 can be included in ingress pipeline 156 at a desired position for testing at least the layer 2 hardware 152 and layer 3 hardware 154. In the illustrated embodiment, the probe detection logic 158 is positioned after the ACL hardware 150. In alternative embodiments, the probe detection logic 158 can also be included in the ACL hardware 150. The probe detection logic 158 (described further below) is hardware logic used to differentiate test probes from regular traffic. Specifically, test probes are diverted back to the CPU 120, while other network packets (e.g., customer traffic) are routed to the output port 142. The different hardware blocks can be coupled in series and additional hardware blocks can be added based on the design. Typical network packets pass from the input port 140 to the output port 142 in accordance with the configuration of the hardware logic blocks 150, 152, 154, and 158.

As shown, an agent 160 can execute on the CPU 120 and can be used to control testing of the network device 110 using a probe 170. The agent 160 passes the probe to the CPU hardware 120 for transmitting the probe to the switching logic 130 via the bus 132 (as shown at 174). The probe is then injected into an ingress pipeline of the switching logic as shown at 176, such that it passes through Layer 2 hardware 152, Layer 3 hardware 154 and the ACL hardware 150. The probe 170 includes an appropriate MAC address that matches a MAC address of the network device 110 so that L3 switching occurs. Specifically, the probe includes a layer 2 header wherein the destination MAC address equals a MAC address of network device 110. The layer 2 hardware 152 performs a lookup on the probe and determines that the probes MAC address matches the network device's MAC address. The probe packet 170 also includes a destination address that is an IP address (faux or real) within the Layer 3 lookup tables (the FIB 155). More particularly, the layer 3 hardware 154 performs a lookup on a prefix of the probe 170 and determines a proper output port 142 that directs the probe packet 170 towards a peer network device. Alternatively, the probe 170 can have the full IP destination address (which includes the prefix) for lookup in the layer 3 hardware 154. In either case, the agent 160 ensures that the probe 170 includes a destination address that is found in the FIB so as to test the forwarding states of the switching logic 130. The probe is rewritten, as shown at 180, to include a proper MAC address for whatever peer network device was determined in the layer 3 lookup. Additionally, the rewritten probe 180 includes an identifier of what output port 142 was determined in the layer 3 lookup. After the rewritten probe 180 passes through the ACL hardware 150, it is detected as a test probe by probe detection logic 158. Rather than transmit the rewritten probe 180 to the output port 142 determined by the layer 3 lookup, the probe detection logic 158 diverts the rewritten probe to the CPU 120, as shown at 182. In some embodiments, the probe detection logic can change a header on the rewritten probe 180 from one of the output ports 142 to a CPU output port so that the rewritten probe 180 is routed to the CPU 120. Thus, the rewritten probe 180 is rewritten again as probe 184 so that it is passed to the CPU 120.

The input port 140, output port 142 and switching logic 130 can be considered a data plane of the network device 110. By contrast, the CPU 120, memory 122, and agent 160 are considered part of a control plane. Thus, the network device 110 is able to perform a self test wherein a probe is injected from the control plane, into the data plane and diverted back to the control plane after the switching logic 130 performs packet switching operations. The control plane can then check whether the switching logic 130 is performing correctly.

Figure 2:
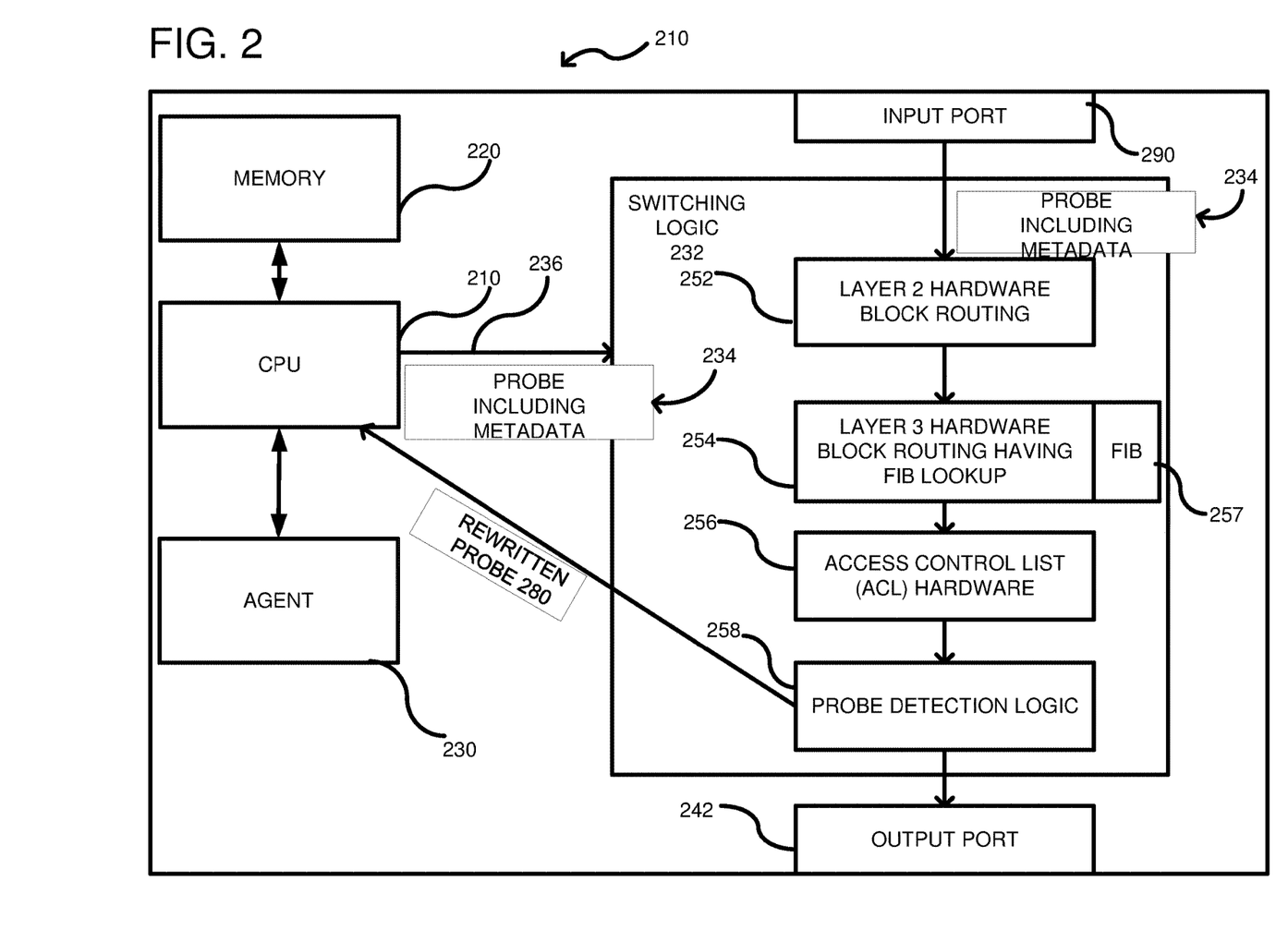
FIG. 2 is a detailed diagram of a second embodiment showing the network device injecting a probe into switching logic using an agent wherein the probe includes metadata for identification purposes.

FIG. 2 shows an embodiment of a network device 210 wherein a self test is performed using probes that include metadata so as to be detectable by the probe detection logic. A CPU 210 is coupled to a memory 220 used to store an operating system and one or more applications that execute on the CPU. One such application can be an agent 230, which initiates the testing by selecting a probe 234 used to test switching logic 232 coupled to the CPU 210 via a bus 236 (a PCIe bus or other bus type). The switching logic 232 includes layer 2 hardware 252, layer 3 hardware 254, and ACL hardware 256. The layer 3 hardware performs a lookup on incoming packets using a FIB 257 that includes a plurality of IP addresses. The switching logic 232 also includes probe detection logic 258. The probe detection logic 258 can detect a probe signature and divert the probe to the CPU 210 when there is a match on the metadata.

The probe signature is generated, at least in part, by the agent 230 that embeds the metadata into the probe as shown at 234. The metadata can take a variety of forms, but can be a series of bits within a header of the probe. The metadata does not impact the layer 2 hardware lookup or the layer 3 hardware lookup. However, the probe detection logic 258 has hardware that is triggered when the probe 234 includes metadata that matches a predetermined hardware configuration within logic 258, as described further below. If the probe 234 does not match the predetermined hardware configuration, then the probe 234 passes to the output port 242 in accordance with the port selected from the layer 3 hardware lookup. Thus, customer packets received on an input port 290 can be passed through the switching logic 232 to the output port 242. On the other hand, if the probe 234 matches the predetermined hardware configuration, then the probe detection logic ignores the layer 3 lookup and diverts the probe to the CPU as a rewritten probe 280. The rewritten probe includes information indicating the result of at least the layer 3 hardware lookup, such as what output port 242 was selected. As previously discussed, the rewritten probe 280 passed to the CPU 210 can be rewritten again by the probe detection logic so as to modify the output port of the probe. Alternatively, the rewritten probe can be transmitted to the CPU without further modification.

Figure 3:
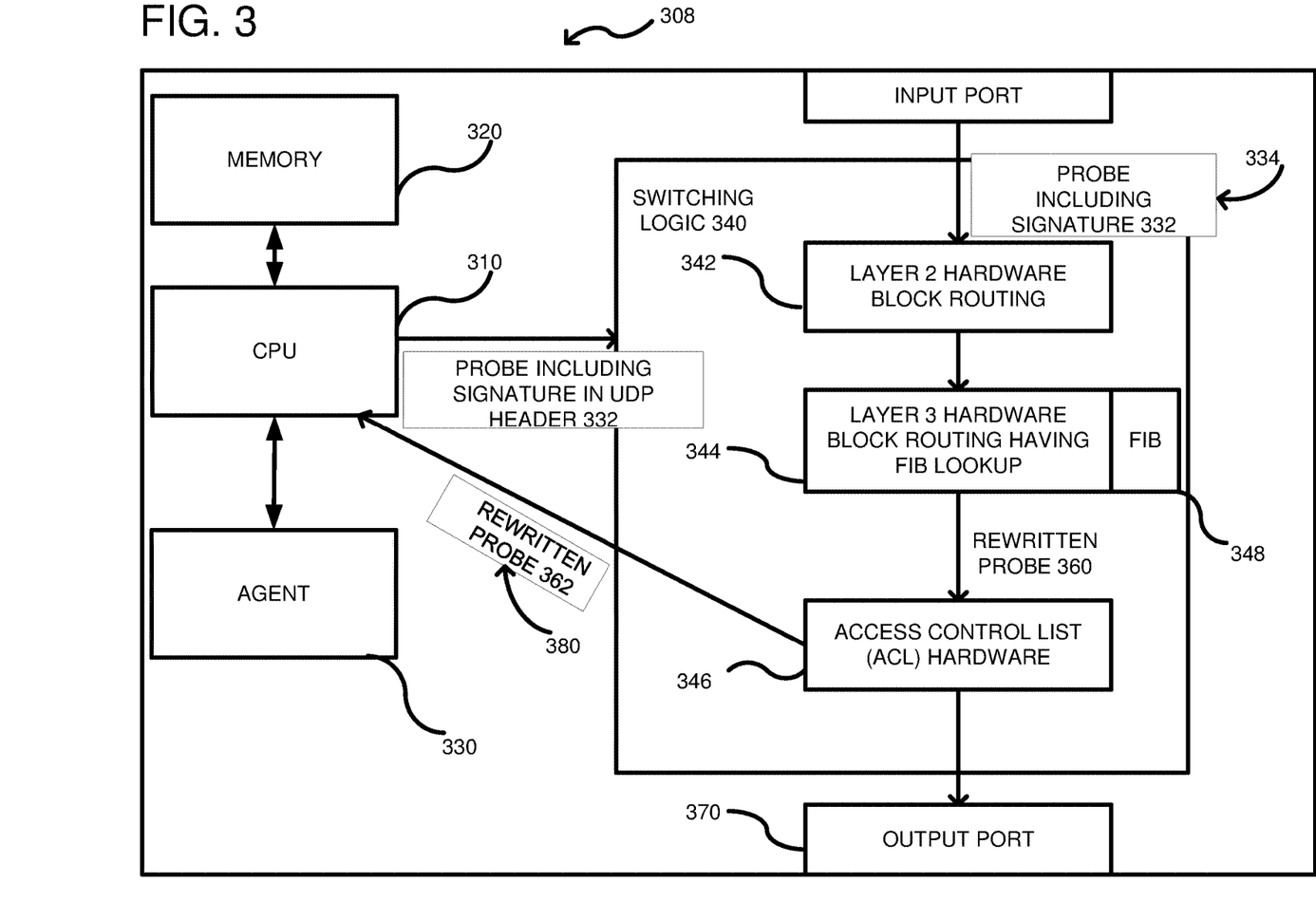
FIG. 3 shows a third embodiment of a network device wherein a probe having a signature in a User Datagram Protocol (UDP) header is injected into the switching logic and detected by Access Control List (ACL) hardware.

FIG. 3 shows yet another embodiment wherein a network device 308 includes a CPU 310, a memory 320 and an agent 330 executing on the CPU 310. In this embodiment, the agent includes a signature that is a User Datagram Protocol (UDP) header of a probe 332. The probe is injected into switching logic 340, as shown at 334. The switching logic 340 includes layer 2 hardware 342, layer 3 hardware 344 and ACL hardware 346. The layer 3 hardware 344 provides for lookups within a FIB 348 and rewrites the probe 332 into a transformed, rewritten probe 360. Probe detection logic is embedded within the ACL 346. Thus, the ACL either allows the rewritten probe 360 to proceed to an output port 370 or the ACL 346 diverts the rewritten probe 360 to the CPU 310, as shown at 380. In the case where the rewritten probe 360 is diverted, it can be rewritten again as a rewritten probe 362, wherein the output port is changed to divert the probe to the CPU 310. Thus, as indicated in FIG. 3, the probe detection logic of FIG. 2 can be embedded in the ACL 346 and signature matching can be based on the UDP header. Once the rewritten probe 362 is received back by the agent 330, the agent performs a check to determine whether the layer 2 hardware 342 and the layer 3 hardware 344 performed the correct lookups (the packet was rewritten as expected). Moreover, the ACL can be tested, as the diversion can occur after the ACL has performed normal packet processing. If the rewritten probe 362 does not match an expected probe, the agent 330 can transmit an error message to a centralized server (not shown). However, if the rewritten probe is correct, the agent 330 can continue to test other entries in the FIB 348 to ensure the layer 3 hardware 344 is operating properly.

Figure 4:
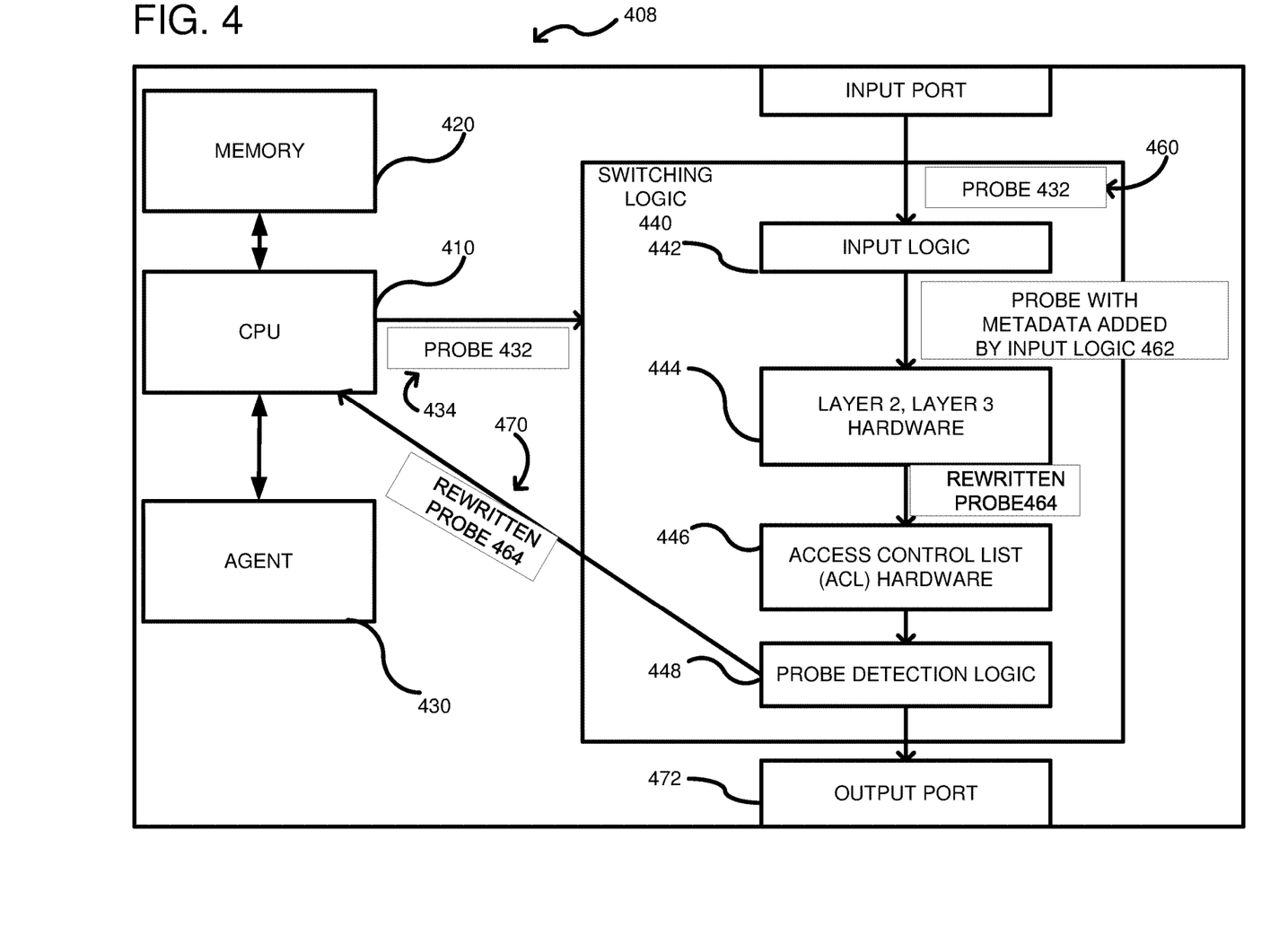
FIG. 4 shows a fourth embodiment of a network device wherein input logic within the switching logic inserts metadata within the probe for purposes of identification.

FIG. 4 is still another embodiment of a network device 408. The network device 408 includes a CPU 410, a memory 420, and an agent 430 executing on the CPU, similar to the other embodiments already described. The agent 430 injects a probe 432, as indicated at 434, into switching logic 440. The switching logic 440 includes input logic 442, layer 2 and layer 3 hardware, shown combined for simplicity at 444, ACL hardware 446, and probe detection logic 448. In this case, the probe 432 is input into the input logic 442, as shown at 460. However, the probe 432 does not include metadata used for purposes of the probe detection logic 448 signature match. Instead, the input logic 442 uses a lookup table (not shown) to determine that the probe 432 is indeed a test probe. In such a case, the input logic 442 inserts metadata into the probe, as indicated at 462. The probe is rewritten as shown at 464 by the layer 2 and layer 3 hardware 444, wherein the rewritten probe still includes the metadata. When the probe 464 reaches the probe detection logic 448, the metadata is used as a signature that is matched. Consequently, the probe is diverted to the CPU 410, as shown at 470, instead of being transmitted to the output port 472. Thus, the layer 3 lookup is ignored in favor of re-routing the probe 464 back to the CPU 410. The agent can then test the rewritten probe 464 by determining whether it matches an expected value. For example, the expected value can indicate a port number that the rewritten probe 464 was to be transmitted to if not diverted by the probe detection logic. In this example, the rewritten probe 464 is diverted without changing it. Thus, in any of the embodiments herein, the rewritten probe can either be changed to force the diversion to the CPU, or, depending on the hardware, such a diversion can occur without changing the rewritten probe.

Figure 5:
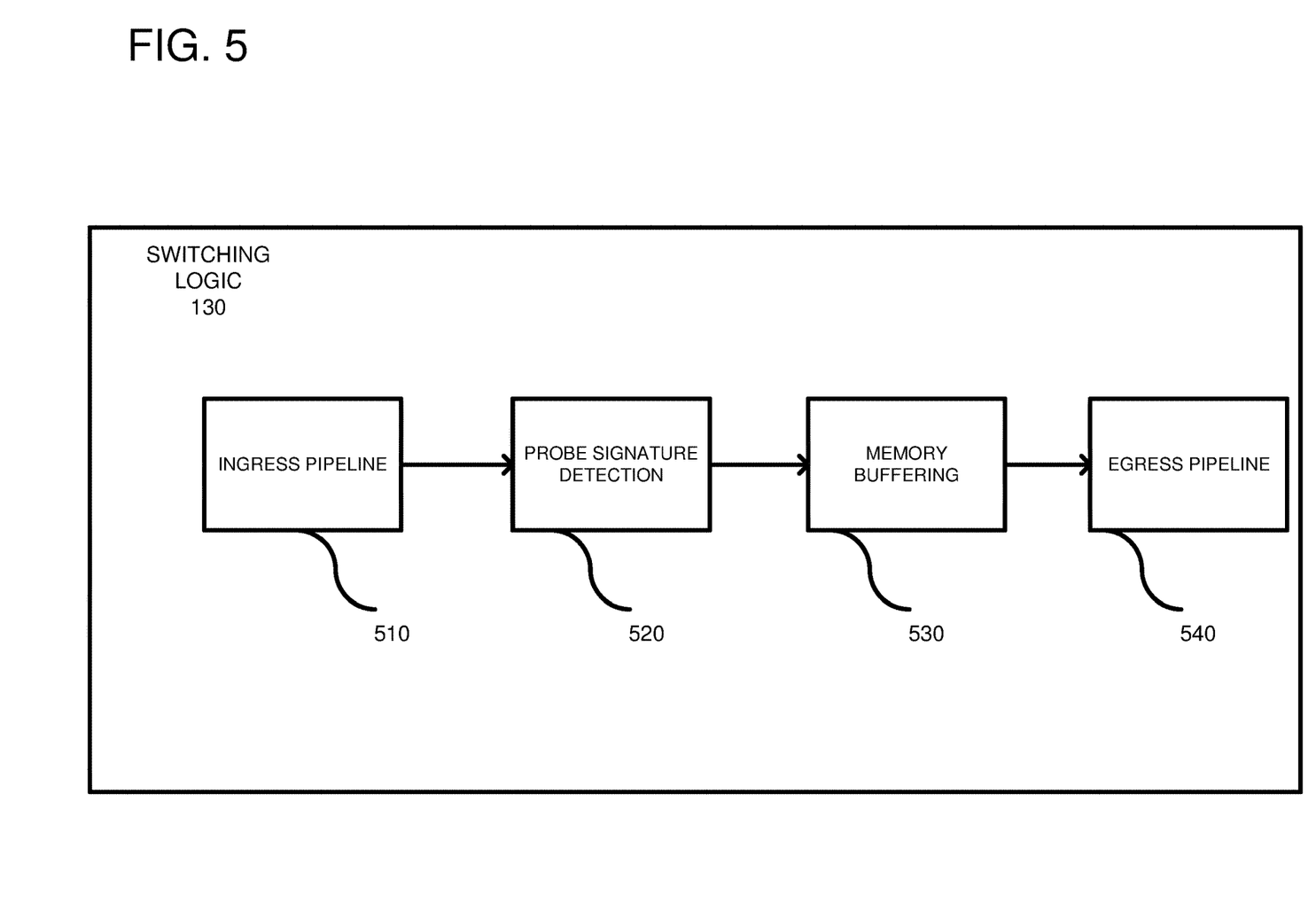
FIG. 5 shows further details of the switching logic including probe signature detection hardware.

FIG. 5 shows further details of the switching logic 130. The switching logic 130 includes an ingress pipeline 510, which can comprise layer 2 hardware, layer 3 hardware and ACL hardware. For example, the ingress pipeline 510 can include the layer 2 hardware 152 (FIG. 1), the layer 3 hardware 154 and the ACL hardware 150. The switching logic 130 can further include probe signature detection hardware 520, which can be positioned within ACL hardware or after the ACL hardware, but prior to memory buffering 530. The probe signature detection hardware 520 can analyze a combination of bits within a packet and can generate a trigger if the bits match a predetermined combination. In one example, bits within a packet's UDP header are used for determining a matching signature. If there is a match, then the ACL considers the packet a probe and routes the packet to an internal CPU. Alternatively, the packet is switched to an output port indicated by the layer 3 lookup. The probe signature detection hardware 510 is the probe detection logic 158 of FIG. 1. However, as shown in FIG. 5, the switching logic 130 can include additional hardware features. For example, the memory buffering 530 is used to queue output packets for delivery on an egress pipeline 540, which can be considered part of the switching logic 130 or part of an output port. Packets are fed from the memory buffer 530 to the egress pipeline 540 and are transmitted to a neighbor network device. The described structure of the switching logic 130 can be applied to all of the embodiments described herein.

Figure 6:
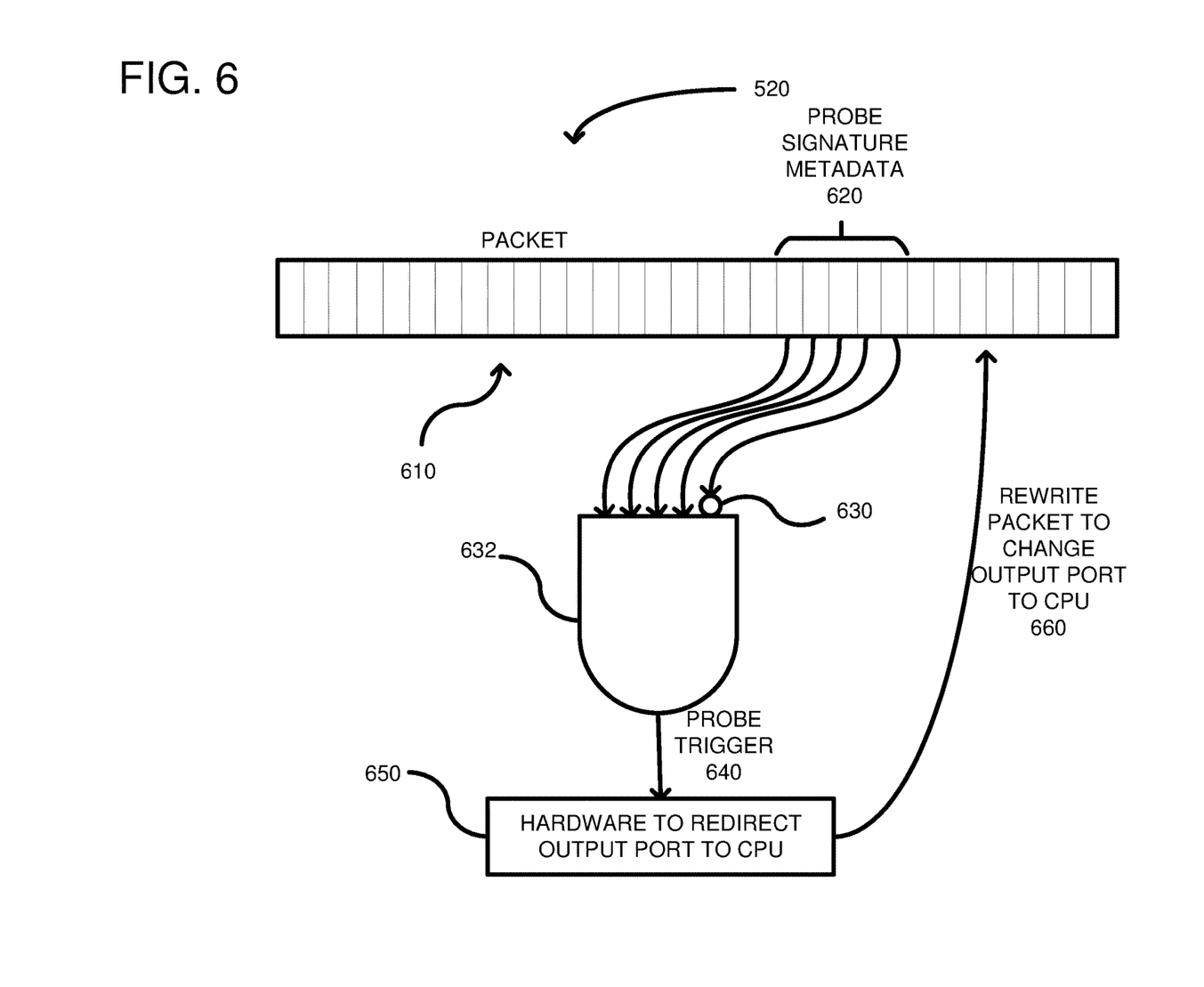
FIG. 6 shows further details according to one embodiment of the probe signature detection hardware of FIG. 5.

FIG. 6 shows further details of an example embodiment of the probe signature detection hardware 520. An exemplary packet 610 is shown having 32 bits, but other size packets can be used. Probe signature metadata 620 is embedded into the packet 610. The probe signature metadata 620 can be stored in any predetermined bit locations within the packet 610, such as a header area of the packet or a payload location of the packet. The probe signature detection hardware 520 monitors for a predetermined bit pattern, which can be any desired combination of 1's and 0's, as is controlled by using inverters, such as inverter 630, into an AND gate 632. Thus, the matching bit pattern is shown as 11110, but other bit patterns can be used. Additionally, the probe signature metadata 620 can be any desired length, although it is illustrated as 5 bits wide. When the bits match a predetermined pattern, the AND gate 632 activates a probe trigger 640. Additional hardware 650 can respond to the trigger 640 by rewriting the packet 610 to change an output port from whatever was determined as a result of the layer 3 lookup to a CPU output port, as indicated at 660. As a result, the packet can be re-routed to the CPU, such as CPU 120 (FIG. 1). Thus, the packet which was rewritten by the layer 3 hardware can be again rewritten by the probe signature detection hardware 520 so as to override the decision by the layer 3 hardware and to change the output port decided by the layer 3 hardware.

Figure 7:
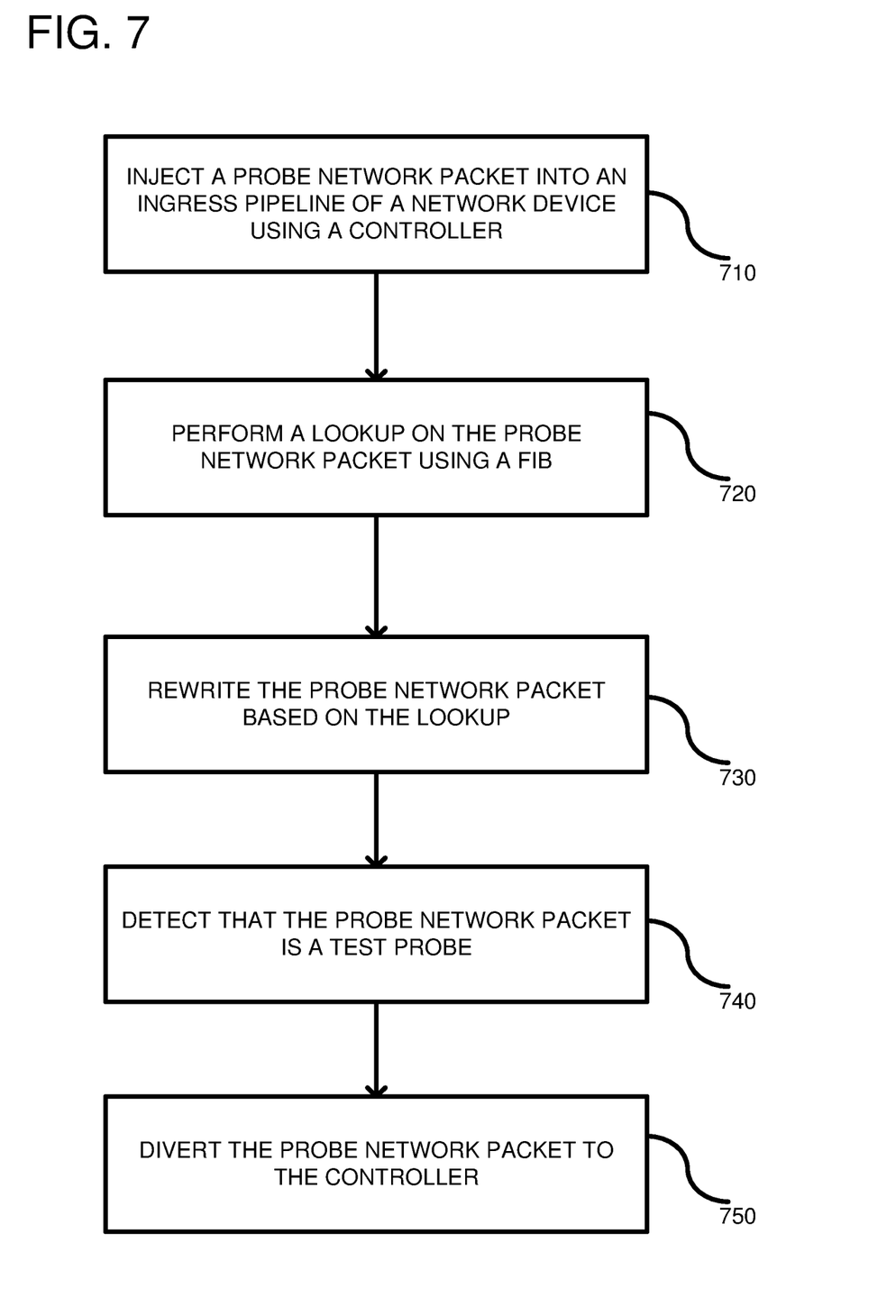
FIG. 7 is a flowchart according to an embodiment for testing a network device using probes passed through the switching logic.

FIG. 7 is a flowchart of an example embodiment of a method for testing forwarding tables in a network device. In process block 710, a probe network packet can be injected into an ingress pipeline of the network device using a controller. For example, in FIG. 1, the CPU 120 injects the probe 170 into the switching logic as directed by the agent 160 executing on the CPU. The probe can include metadata, as shown at 234 in FIG. 2. Alternatively, the probe can include a signature within a UDP header as shown at 332 in FIG. 3. Still further, the probe might not include a signature as shown at 432 in FIG. 4. Typically, if no signature is included then input logic 442 can determine that the packet is a probe and add metadata to the probe. In process block 720, a lookup is performed on the probe network packet using a FIB. For example, returning to FIG. 1, the layer 3 hardware 154 can perform a lookup in the FIB 155. In process block 730, the probe network packet can be rewritten based on the lookup. Thus, as shown at 180 in FIG. 1, the layer 3 hardware 154 can rewrite the probe by determining an output port 142 that the probe network packet should be routed to (based on the IP address) as well as changing the layer 2 header to the correct MAC address for a neighbor network device. In process block 740, a detection is made that the probe network packet is a test probe. Thus, as shown in FIG. 1, the probe detection logic 158 can either determine that the packet is normal traffic and pass the packet to the output port, or it can determine that the packet is a test probe. For example, as shown in FIG. 6, a test probe can include metadata 620 that is matched by hardware 632 to generate a probe trigger signal 640. In process block 750, when the packet is determined to be a test probe, the packet is diverted from its normal flow (whatever port the layer 3 lookup determined) to a CPU port so that it can be passed to the controller, which in FIG. 1 is a CPU 120. If desired, the agent 160 can perform an analysis to determine whether the lookup was performed correctly. For example, the agent 160 can compare the rewritten probe 184 against a predetermined probe that is expected by the agent. If there is a difference, the agent 160 can transmit an error message to a centralized controller. Otherwise, the agent can continue testing the forwarding states of the FIB.

Figure 8:
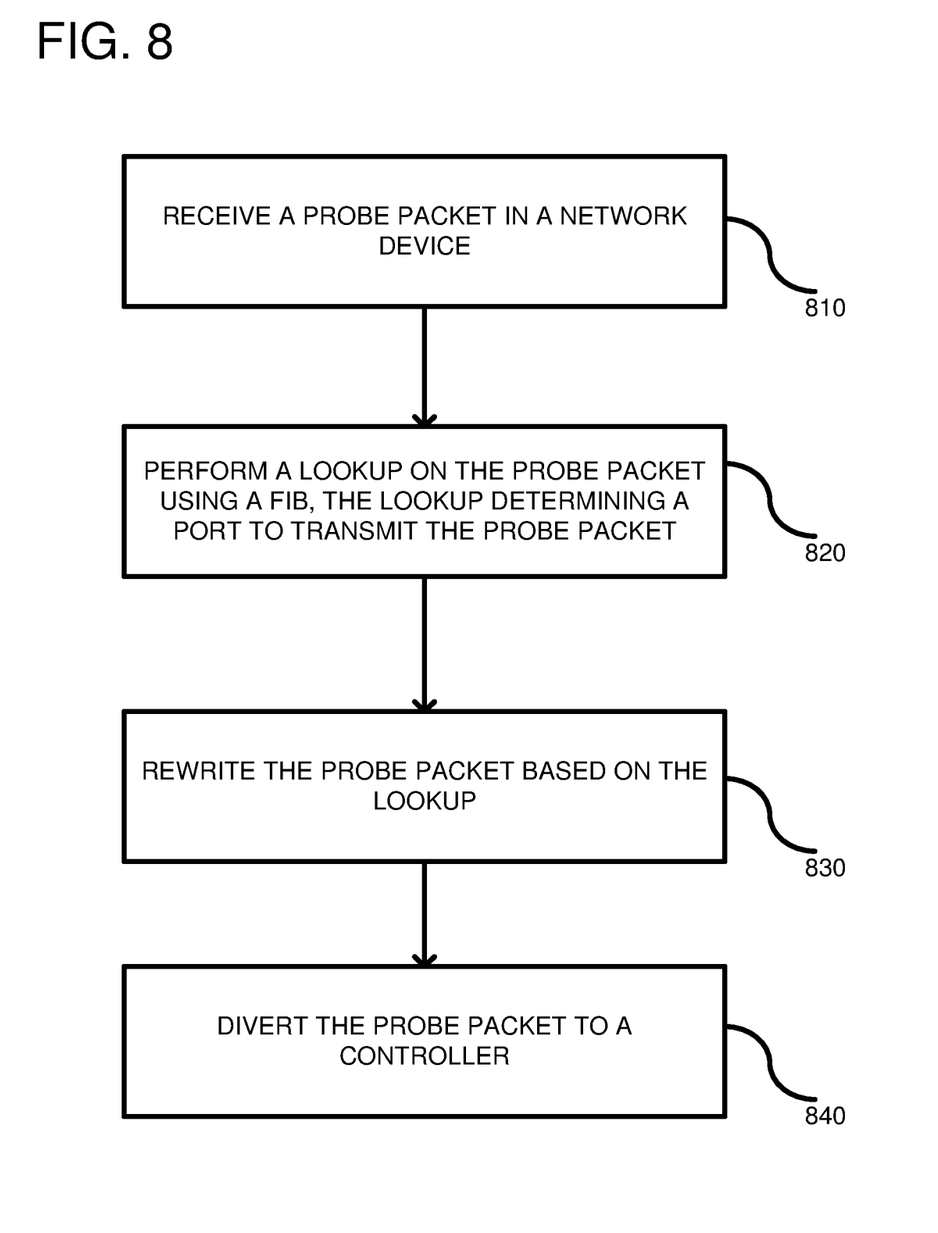
FIG. 8 is a flowchart according to another embodiment for testing a network device using probes passed through the switching logic.

FIG. 8 is a flowchart of a method according to another embodiment for testing a network device. In process block 810, a probe packet is received in a network device. Instead of receiving the probe packet from an external device, the probe packet is received from a CPU within the control plane of the same network device. For example, turning to FIG. 1, the probe packet is received by the switching logic 130 from the CPU 120. In some embodiments, after receipt of the probe packet in the switching logic, the packet can be rewritten to include metadata. For example, in FIG. 4, the switching logic 440 can include, within an ingress pipeline, input logic 442 that modifies the probe 432 received from the CPU 410 to include metadata, which can be detected downstream in the ingress pipeline in the probe detection logic 448. In process block 820, a lookup is performed on the probe packet using the FIB, wherein the lookup determines what output port the packet should be sent to. Although the probe packet is a test probe, from the perspective of the layer 3 hardware, it is a real packet with a destination address that is within the FIB. The destination address is an IP address of a device external to the network device being tested. In some embodiments, the probe packet can include metadata inserted by the controller into the probe packet. For example, in FIG. 2, the probe packet 234 already includes the metadata needed for identifying the packet as a test probe. In process block 830, the probe packet is rewritten based on the lookup. Returning to FIG. 1, the rewritten probe 180 is generated by the layer 3 hardware 154, which modifies at least the layer 2 header and identifies an output port on which to transmit the packet so that it can reach the IP address within the packet. However, rather than transmitting the packet on the identified output port, the probe packet is diverted to the controller (process block 840). Diverting of the probe packet is based on matching a signature that identifies the packet as a test probe. The signature can be metadata embedded at any desired location within the packet, and desirably at a place that cannot be confused with real (non-probe) traffic. Once the packet is diverted to the CPU (the controller), it completes its loop from the CPU, through the switching logic and back to the CPU. The CPU can then analyze the probe to ensure that it was properly rewritten by the layer 3 hardware.

Figure 9:
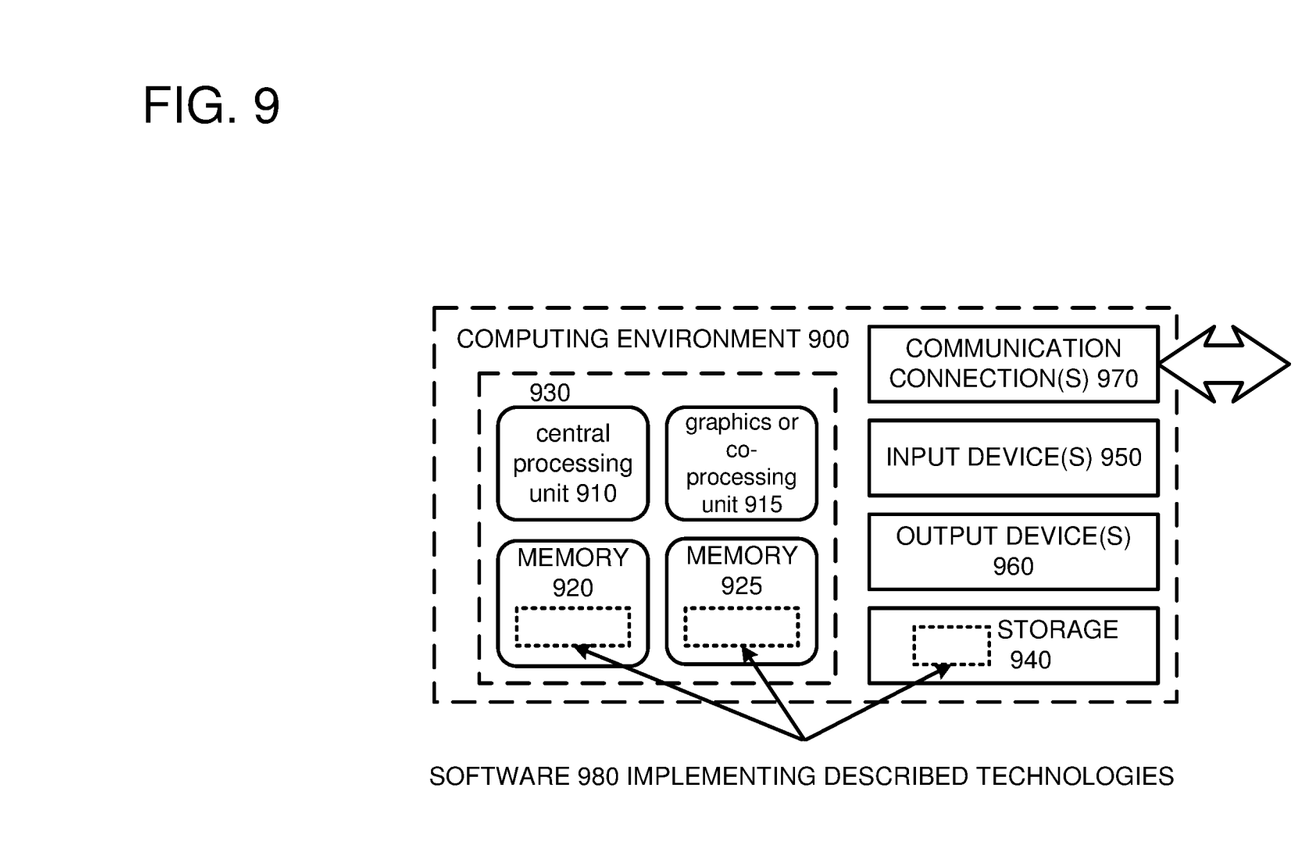
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). In one embodiment, aspects of the computing environment 900 can be used in the network devices described herein.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing forwarding tables in a network device, comprising:
    injecting a probe network packet into an ingress pipeline of switching logic of the network device, after an input port of the network device and before layer 3 hardware of the network device, using a controller on the network device, wherein the controller expects the probe network packet to be received back from the switching logic;
    within the switching logic:
        performing a lookup on the probe network packet using a Forwarding Information Base (FIB) within the network device so as to test the FIB on the network device;
        rewriting the probe network packet based on the lookup;
        detecting that the probe network packet is a test probe; and
        diverting the probe network packet to the controller for analysis by the controller of whether the lookup was performed correctly.

2. The method of claim 1, wherein the injecting of the probe network packet is generated from an agent executing on the network device and the agent performs the analysis to determine whether the lookup was performed correctly.

3. The method of claim 1, wherein the detecting includes matching a probe signature embedded within the probe network packet.

4. The method of claim 3, wherein the probe signature is embedded within the probe network packet after the injecting of the probe network packet by input logic that receives the probe network packet from the controller.

5. The method of claim 3, wherein the probe signature is embedded within the probe network packet prior to the injecting of the probe network packet.

6. The method of claim 1, further including performing a layer 2 lookup prior to the lookup using the FIB.

7. A method, comprising:
    receiving a probe packet in a network device after an input port of the network device and before layer 3 hardware of the network device;
    performing a lookup on the probe packet using a Forwarding Information Base (FIB), the lookup determining a port of the network device on which to transmit the probe packet;
    rewriting the probe packet based on the lookup; and
    diverting the probe packet to a controller in the network device, rather than the port.

8. The method of claim 7, wherein the diverting of the probe packet to the controller includes ignoring a port determined in the lookup for forwarding the probe packet.

9. The method of claim 7, wherein the probe packet is received from the controller on the network device.

10. The method of claim 7, wherein the receiving the probe packet includes receiving the probe packet with metadata already inserted into the probe packet by the controller.

11. The method of claim 7, wherein the receiving of the probe packet is within an ingress pipeline, the method further including, inserting metadata into the probe packet after the receiving.

12. The method of claim 7, wherein the rewriting of the probe packet includes rewriting a layer 2 header based on the lookup.

13. The method of claim 7, further including detecting that the probe packet is a test probe by matching a signature within the probe packet.

14. The method of claim 13, wherein the detecting is accomplished using hardware positioned after the ingress pipeline and before a memory buffer.

15. The method of claim 13, wherein the matching of the signature includes matching a User Datagram Protocol (UDP) header in the probe packet to a predetermined UDP header.

16. The method of claim 7, wherein the network device performs layer 2 and layer 3 lookups using the probe packet.

17. A network device, comprising
    a controller;
    switching logic including layer 2 hardware and layer 3 hardware, wherein the controller is configured to insert a probe packet into the switching logic after an input port of the network device and before the layer 3 hardware so that the probe packet can be rewritten; and probe detection logic within the switching logic, the probe detection logic configured to detect that the probe packet is a test probe and to divert the probe packet to the controller after it is rewritten.

18. The network device of claim 17, wherein the probe detection logic includes hardware for matching a signature of the probe packet.

19. The network device of claim 17, wherein the layer 3 hardware is configured to perform a lookup in a Forwarding Information Base (FIB).

20. The network device of claim 17, wherein the probe detection logic includes hardware for matching a predetermined User Datagram Protocol (UDP) header to a UDP header within the probe packet.

21. An Integrated Circuit (IC), comprising:
switching logic, including layer 2 hardware and layer 3 hardware, configured to receive a probe packet from a controller before the layer 2 hardware and to perform both layer 2 and layer 3 processing on the probe packet in the layer 2 and layer 3 hardware, respectively, so as to rewrite the probe packet; and probe detection logic within the switching logic, the probe detection logic configured to detect that the probe packet is a test probe and to divert the probe packet to the controller after it is rewritten.

\* \* \* \* \*